United States Patent
Wesoky et al.

(10) Patent No.: US 10,592,950 B2
(45) Date of Patent: Mar. 17, 2020

(54) SYSTEMS AND METHODS FOR ON-LINE PURCHASE OF ITEMS DISPLAYED WITHIN VIDEO CONTENT

(71) Applicant: SLING MEDIA INC., Foster City, CA (US)

(72) Inventors: Brett Wesoky, San Francisco, CA (US); Timothy Meyer, Denver, CO (US)

(73) Assignee: SLING MEDIA LLC, Foster City, CA (US)

( * ) Notice: Subject to any disclaimer, the term of this patent is extended or adjusted under 35 U.S.C. 154(b) by 729 days.

(21) Appl. No.: 14/794,631

(22) Filed: Jul. 8, 2015

(65) Prior Publication Data

US 2016/0189269 A1 Jun. 30, 2016

Related U.S. Application Data

(60) Provisional application No. 62/098,723, filed on Dec. 31, 2014.

(51) Int. Cl.
*G06Q 30/00* (2012.01)
*G06Q 30/06* (2012.01)

(52) U.S. Cl.
CPC ..... *G06Q 30/0623* (2013.01); *G06Q 30/0641* (2013.01)

(58) Field of Classification Search
None
See application file for complete search history.

(56) References Cited

U.S. PATENT DOCUMENTS

| | | | |
|---|---|---|---|
| 9,087,358 B1* | 7/2015 | Giorgalli | G06Q 30/0633 |
| 2007/0168543 A1* | 7/2007 | Krikorian | G11B 27/034 |
| | | | 709/231 |
| 2008/0033840 A1* | 2/2008 | Upendran | G06Q 30/02 |
| | | | 705/26.1 |
| 2009/0177758 A1* | 7/2009 | Banger | G06Q 30/0241 |
| | | | 709/219 |
| 2010/0153831 A1* | 6/2010 | Beaton | G06Q 30/02 |
| | | | 715/201 |
| 2011/0307931 A1* | 12/2011 | Shuster | G06F 17/30817 |
| | | | 725/105 |
| 2013/0014145 A1* | 1/2013 | Bhatia | H04N 21/252 |
| | | | 725/13 |
| 2013/0132842 A1* | 5/2013 | Kashyap | G06F 3/0481 |
| | | | 715/719 |

(Continued)

OTHER PUBLICATIONS

Crain Communications, Inc.; "GoldPocket Puts Products in Hot Spot; With Interactive Technology Viewers Click on Item Placements in Shows"; Oct. 3, 2005; Crain Communications, Inc. (Year: 2005).*

*Primary Examiner* — Naeem U Haq
*Assistant Examiner* — Norman Donald Sutch, Jr.
(74) *Attorney, Agent, or Firm* — Lorenz & Kopf LLP (57) ABSTRACT

A method for viewing media content includes receiving, from a user viewing the media content, a request for product data corresponding to the media content. In response to the request, the product data is sent over a network to a computing device operable by the user. The product data includes a list of the one or more purchasable products and, for each of the purchasable products, a link to an online commerce site from which the purchasable product may be purchased.

6 Claims, 3 Drawing Sheets

(56) References Cited

U.S. PATENT DOCUMENTS

| | | | |
|---|---|---|---|
| 2014/0100993 A1* | 4/2014 | Farmer | G06Q 30/0251 |
| | | | 705/27.1 |
| 2014/0355907 A1* | 12/2014 | Pesavento | G06F 17/30038 |
| | | | 382/305 |
| 2016/0180427 A1* | 6/2016 | Gonzales, Jr. | G06Q 30/0623 |
| | | | 705/26.61 |
| 2017/0026672 A1* | 1/2017 | Dacus | G06Q 30/0233 |
| 2018/0096315 A1* | 4/2018 | Patel | G06Q 30/0207 |

* cited by examiner

SYSTEMS AND METHODS FOR ON-LINE PURCHASE OF ITEMS DISPLAYED WITHIN VIDEO CONTENT

CROSS-REFERENCE TO RELATED APPLICATIONS

This application claims priority to U.S. Provisional Patent Application No. 62/098,723, filed Dec. 31, 2014, the contents of which are hereby incorporated by reference.

TECHNICAL FIELD

The present disclosure generally relates to the viewing of media content and online shopping. More particularly, the following discussion relates to systems, methods, and devices for purchasing items displayed within video content.

BACKGROUND

It is often the case that a user, while viewing a television show, movie, or other video content, observes an item displayed within the video content that he or she wishes to purchase. If the user has access to a tablet computer, mobile device, or other device providing a "second screen" experience, the user might attempt to search for the item and purchase it online, or might make a note to search for the item later. As will be appreciated, however, it is typically very difficult to identify—by appearance only—an item that is shown only briefly within a TV program or movie. Furthermore, even if the user is able to locate the correct item, the time necessary to do so can result in an undesirable interruption in viewing the actual TV program or movie.

Accordingly, there is a need for improved systems, devices, and techniques for purchasing items shown in television shows and other video content. These and other desirable features and characteristics will become apparent from the subsequent detailed description and the claims, taken in conjunction with the accompanying drawings and this background section.

SUMMARY

It is often the case that a user, while viewing a television show, movie, or other video content, observes an item displayed within the video content that he or she wishes to purchase. Accordingly, the following provides systems and methods for purchasing products displayed within video content. In an embodiment, the method includes receiving, from a user viewing the media content, a request for product data corresponding to the media content. In response to the request, the product data is sent over a network to a computing device operable by the user. The product data includes a list of the one or more purchasable products; and, for each of the purchasable products, a link to an online commerce site from which the purchasable product may be purchased.

BRIEF DESCRIPTION OF THE DRAWING FIGURES

Exemplary embodiments will hereinafter be described in conjunction with the following drawing figures, wherein like numerals denote like elements.

DETAILED DESCRIPTION

Systems and methods are provided for purchasing products displayed within video content. Briefly, an external database includes product data identifying a list of products that are available for any particular media content. When viewing the media content, the user may execute an application (on a tablet computer, a smart-phone, or on the media device itself) that, for applicable media content searchable by the user, provides links to the products displayed within the media content. In that regard, the following detailed description of the invention is merely exemplary in nature and is not intended to limit the invention or the application and uses of the invention. Furthermore, there is no intention to be bound by any theory presented in the preceding background or the following detailed description.

Figure 1:
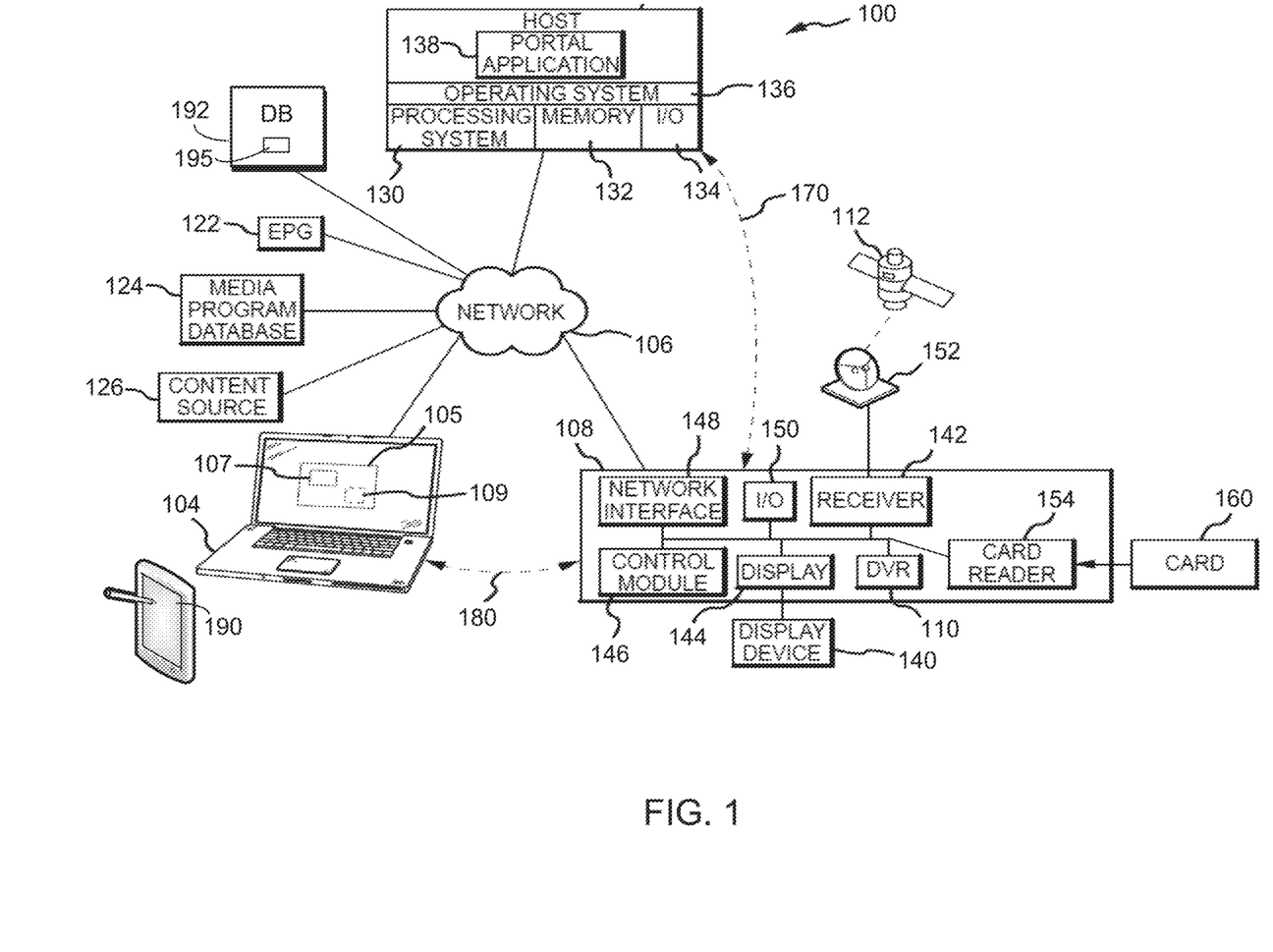
FIG. 1 is a block diagram illustrating a place-shifting system in which the present embodiments may be implemented.

The systems and methods described herein may be implemented in the context of a wide variety of entertainment devices and systems. FIG. 1 depicts just one, non-limiting, example: a system 100 for placeshifting or otherwise transferring data or content, such as a media program (or media content), from a source electronic device 108 to a destination electronic device 104 over a network 106 for presentation to a user (or viewer) on the destination electronic device 104.

For purposes of explanation, but without limitation, the source device 108 may be alternatively referred to herein as a media device or a placeshifting device, and the destination electronic device 104 may be alternatively referred to herein as a playback device or a client device (or client). The placeshifting system 100 also includes a host server 102 (or host) that communicates or otherwise interacts with the devices 104, 108 over the network 106 to facilitate establishment of a peer-to-peer connection 180 over the network 106, which may be utilized for a placeshifting session.

In one embodiment, as described in further detail below, system 100 includes a server 192 that stores and provides product data 195 specifying which products are available to purchase within any particular episode, series, or the like, along with links that allow a user to purchase those products (e.g., hypertext links to participating online vendors). In one embodiment, the user may utilize an application running on a mobile device 190 to request, for particular media content being viewed in real-time on device 104 (or any other display), appropriate product data 195 from server 192.

It should be understood that FIG. 1 is a simplified representation of the placeshifting system 100 for purposes of explanation is not intended to limit the subject matter described herein in any way.

In practice, the client device 104 may be any device, component, module, hardware and/or the like that is capable of communicating with the server 102 over network 106. For example, depending on the embodiment, client device 104 may be realized as a conventional personal computer, portable computer, a tablet computer, workstation and/or other computing system, a mobile (or cellular) telephone, a smart-phone, a personal digital assistant, a video game player, and/or any other device capable of receiving media programs via the network 106 and presenting audio and/or visual content. In this regard, the client device 104 includes a display device, such as a monitor, screen, or another conventional electronic display, capable of graphically presenting visual content, data and/or information that is generated or otherwise provided by an application 105, 107 executing on the client 104. The client device 104 may further include a user input device, such as a keyboard, a mouse, a touchscreen, or the like, capable of receiving input data and/or other information from the user of the client device 104. The client device 104 also includes a processing system and a data storage element (or memory) that is coupled to or otherwise accessed by the processing system and stores programming instructions that, when read and executed, cause the processing system of the client device 104 to generate one or more applications 105, 107, 109 executing thereon and perform various tasks, functions, processes and/or operations and support the subject matter described herein. The processing system may be realized as any sort of processor, microprocessor, microcontroller, digital signal processor, or any other suitable processing device, or any suitable combination thereof.

The client 104 may reside at a geographic location that is remote or otherwise physically distinct from the geographic location of the media device 108. In this regard, the media device 108 may have an essentially fixed or permanent geographic location, whereas the geographic location of the client 104 may be transient or otherwise variable with respect to the location of the media device 108. For example, the media device 108 may be realized as a set-top box or a similar device that resides at a user's home for providing media content to the user's television or other home display device 140, while the client 104 is realized as a portable electronic device, such as a mobile phone or other mobile computing device, that moves about with the user.

In the embodiment shown in FIG. 1, client device 104 executes a conventional browser or other client application 105 that is compatible with standard Internet, world wide web (WWW), transmission control protocol, and/or Internet Protocol (TCP/IP), and/or other formats. Such browsers are typically capable of displaying active or other documents formatted in accordance with published protocols and/or computer languages (e.g., hypertext markup language (HTML), extensible markup language (XML), cascading style sheets (CSS), Javascript, and/or the like). Many browsers are also capable of executing "plugin" applications, applets or the like. Such plugins may be formatted in accordance with ActiveX, JAVA, Javascript and/or any number of other formats. A number of commonly used web browsers are available for a number of different computing platforms, and the subject matter described herein is not limited to any particular browser application. In the illustrated embodiment, client 104 further includes a media player application 107. The media player 107 may be a standalone media player, or the media player 107 may be implemented as a plugin or other applet that runs within the client application 105 as desired. In some embodiments, media player 107 is initially obtained from a networked host, such as server 102. The media player 107 may be retrieved on an as-needed basis in some embodiments, or may be stored at client 104 for subsequent execution.

With continued reference to FIG. 1, in exemplary embodiments, media device 108 is any form of device, module, component, hardware and/or the like capable of receiving and processing media content from one or more content sources. For example, in some embodiments, media device 108 is a set-top box (STB) or similar system that is able to receive television programming and/or to record certain programs that can be viewed on a display device 140, such as a television, monitor, liquid crystal display (LCD), light emitting diode (LED) display, plasma display, or the like. Exemplary embodiments of media device 108 will therefore include or otherwise be coupled to a receiver interface 142 for receiving satellite, cable and/or broadcast programming signals from broadcast sources 112, as well as a data storage medium 110 (e.g., a hard disk, flash memory, or another suitable non-volatile data storage element) to support a digital video recorder (DVR) feature and/or functionality, a display interface 144 for providing imagery to the display device 140, and a control module 146 that directs the operations of the media device 108 as appropriate. For convenience, but without limitation, the data storage medium 110 is alternatively referred to herein as a DVR. Media device 108 may also include one or more interfaces 148 to the network 106 and/or an input/output interface 150 to a remote control or other device for providing user inputs to the media device 108, as appropriate. For example, the network interface(s) 148 of the media device 108 may include an interface or port for a wired communications layer (e.g., an Ethernet port or adapter), an interface for a wireless communications layer (e.g., an IEEE 802.11-compatible transceiver), and/or the like.

The components in media device 108 may be provided within a common chassis or housing as depicted in FIG. 1, although equivalent embodiments may implement media device 108 with any number of inter-connected but discrete components or systems. For example, in some embodiments, the media device 108 may be realized as a combination of a STB and a placeshifting device, wherein some features of the media device 108 (e.g., the DVR 110, the receiver 142, the display interface 144, and/or I/Os 150) are implemented by the STB and other features of the media device 108 (e.g., the network interface 148) are implemented by the placeshifting device, wherein the placeshifting device works in conjunction with the STB to shift the viewing experience from a home television (e.g., display device 140) to a viewing display on the client device 104 that is accessed via the network 106. Examples of placeshifting devices that may be used in some embodiments of media device 108 could include any of the various SLINGBOX products available from Sling Media of Foster City, Calif., although other products or servers could be used in other embodiments. Many different types of placeshifting devices are generally capable of receiving media content from an external source, such as any sort of DVR or STB, cable or satellite programming source, DVD player, and/or the like. In other embodiments, placeshifting features are incorporated within the same device that provides content-receiving or other capabilities. Media device 108 may be a hybrid DVR and/or receiver, for example, that also provides transcoding and placeshifting features. It should be appreciated that FIG. 1 depicts merely one exemplary embodiment of a media device 108, and in practice, the media device 108 may be logically and physically implemented in any manner to suit the needs of a particular embodiment.

In the exemplary embodiment illustrated in FIG. 1, media device 108 is capable of receiving digital broadcast satellite (DBS) signals transmitted from a broadcast source 112, such as a satellite, using an antenna 152 that provides received signals to the receiver 142. Equivalent embodiments, however, could receive programming at receiver 142 from any sort of cable connection, broadcast source, removable media, network service, external device and/or the like. In some embodiments, the media device 108 may also include an access card interface or card reader 154 adapted to receive an access card 160 (or viewing card) configured to ensure that the viewer is authorized to view media content provided to the primary display device 140. In this regard, the access card 160 includes unique identification information associated with a particular subscriber to the broadcast content source 112 or otherwise includes subscription information that facilitates receiving and/or decoding media content provided by the broadcast content source 112.

The DVR 110 feature stores recorded programming (e.g., recorded broadcast programming received via receiver 142) on a hard disk drive, memory, a networked server, or other storage medium as appropriate in response to user/viewer programming instructions, wherein the recorded programming may be subsequently viewed via the media device 108, either on display device 140 or client device 104 via network 106. Content stored in DVR 110 may be any sort of file-based programming or other content that is accessible to media device 108. In various embodiments, in addition to storing broadcast programming, the DVR 110 may also store programming received from other sources not illustrated in FIG. 1, such as, for example, programming downloaded from an on-demand programming source or an online programming source. Additionally, content in DVR 110 may be stored in any sort of compressed or uncompressed format, as desired, and may be encoded or transcoded as desired for effective receipt, storage, retrieval and playing.

The control module 146 is any sort of hardware, circuitry, processing logic and/or other components capable of directing the operations of media device 108. In various embodiments, control module 146 includes software or firmware logic and/or other programming instructions residing in a memory and executing on any sort of processing system, such as any sort of processor, microprocessor, microcontroller, digital signal processor or the like. The instructions, when read and executed, cause the control module 146 to perform various tasks, functions, processes and/or operations and otherwise support the subject matter described herein. In various embodiments, the control module 146 is based upon a "system on a chip" (SoC) implementation that incorporates a hybrid microcontroller with memory, input/output and other features to perform the various signal processing and other actions of media device 108. Other embodiments may implement control module 146 and/or the other features of media device 108 with any number of discrete and/or integrated processing components (e.g., any sort of microprocessor or microcontroller), memories, input/output features and/or other features as desired. The control module 146 communicates with the network interface 148 to establish a peer-to-peer connection 180 to the client device 104 over the network 106 and support streaming of media programs (e.g., from the DVR 110 or the receiver 142) to the client device 104 over the network 106 via the peer-to-peer connection 180, as described in greater detail below.

In the embodiment of FIG. 1, the network 106 is any communications network (or a combination of communications networks) capable of transmitting data between devices within the system 100. In various embodiments, network 106 includes any number of public or private data connections, links or networks supporting any number of communications protocols. Network 106 may include the Internet, for example, or any other network. Such networks may be based upon TCP/IP or other conventional protocols, although other embodiments may use any type of alternate or successor protocols, as desired. In various embodiments, network 106 may also incorporate a wireless and/or wired telephone network, such as a cellular communications network for communicating with mobile phones, personal digital assistants, and/or the like. Various embodiments of network 106 may also incorporate any sort of wireless or wired local area networks (LANs), wide area networks (WAN), or the like.

In the illustrated embodiment of FIG. 1, the server 102 may be realized as one or more server computers or other device(s) coupled to the network 106 and capable of interacting with the devices 104, 108 to facilitate communications between the client device 104 and the media device 108 associated with the user or operator of the client 104. The server 102 may be implemented with a server computer system or data processing system that is based upon any processor, architecture and/or operating system, and will typically be implemented using a processing system 130, memory 132, and input/output features 134. Various embodiments may be implemented using dedicated or shared hardware servers; other implementations may make use of virtual server features as part of a "cloud computing" service, such as any of the cloud computing services provided by any number of providers.

While FIG. 1 illustrates a single server 102, many practical embodiments of the system 100 may provide a cluster or other collection of multiple host servers 102 to support any desired number of simultaneous communications with multiple clients 104 and/or multiple media devices 108. This cluster may also incorporate appropriate routing, load balancing, access and security mechanisms and or any number of other features. In various embodiments, each server 102 is an actual or virtual computer system executing an operating system 136 in conjunction with the processing system 130, memory 132 and/or I/O features 134 to provide a computing core that is capable of executing a portal application 138, as well as any number of daemons, processes, applications or other modules as desired. For example, a portal application 138 could execute as a daemon on the server 102, with connections to separate clients 104 being managed as separate processes or instances that communicate with portal application 138 using features provided by operating system 136. In one or more embodiments, the memory 132 stores programming instructions that, when read and executed, cause the processing system 130 to create, generate, or otherwise facilitate the portal application 138 and perform various tasks, functions, processes and/or operations described herein. In this regard, the memory 132 represents any non-transitory short or long term data storage element or other computer-readable media capable of storing programming instructions for execution by or on the processing system 130.

The user of the client 104 is able to connect to the portal application 138 supported by host 102 via the network 106, for example, by directing the client application 105 to a URL or other network address associated with host 102 and/or portal application 138. In exemplary embodiments, after the user is successfully authenticated by the portal application 138, the host 102 and/or portal application 138 establishes a connection 170 over the network 106 to the media device 108 that is associated with the user. Thereafter, the host 102 and/or the portal application 138 utilizes the connection 170 to obtain, from the media device 108 via the network 106, information about programming stored at the media device 108 and available for placeshifting to the client device 104, such as, for example, a listing of the media programs stored on DVR 110. It should be noted that although FIG. 1 depicts the network connection 170 as being between the host 102 and the media device 108, in practice, the placeshifting system 100 may include one or more intermediary components (e.g., one or more message servers) configured to establish, facilitate, or otherwise support the connection 170.

Server 102 is coupled to an electronic program guide 122, which may be realized as a server, a database, or another device operating on the network 106 that maintains information pertaining to current and/or future broadcasts (or airings) of media programs that are available to be received from broadcast source 112 (e.g., by the media device 108 via receiver 142 and/or antenna 152). The server 102 and/or the portal application 138 may obtain information pertaining to current and/or future broadcasts (or airings) of media programs from the electronic program guide 122 and generate or otherwise provide a program guide graphical user interface (GUI) display on the client device 104 (e.g., within client application 105) that indicates media programs that are or will be available for streaming from the media device 108. The user of the client device 104 may manipulate or otherwise utilize the graphical user interface (or the graphical user interface elements contained therein) to select or otherwise identify media programs for streaming to the client device 104 and/or recording to the DVR 110. The user may pause or otherwise stop presentation of the streamed media program and manipulate or otherwise operate the client application 105 to transmit or otherwise provide 412, via the network 106, a request for content to a third-party content source 126 (e.g., a third-party website). The third-party content source 126 responds to the request by transmitting or otherwise providing content to the client device 104 via the network 106.

In the illustrated embodiment of FIG. 1, the placeshifting system 100 also includes a media program database 124 that includes verified or validated metadata and/or other descriptive information for a vast array of media programs. For example, the media program database 124 may contain metadata and/or other descriptive information pertaining to substantially all of the media programs that may be available from one or more content sources within placeshifting system 100 (e.g., information pertaining to any media programs that have previously been aired by a broadcast source 112, along information pertaining to any movie that has been presented in theaters, made available on-demand, or released for individual use (e.g., on digital video disc (DVD) or the like)). In exemplary embodiments, for each media program having a record (or entry) in the media program database 124, the media program database 124 maintains a media data object that includes one or more fields of metadata associated with that media program along with one or more fields of program identifiers that may be used to identify that media program record. In this regard, the program guide 122 and the media program database 124 may utilize the same program identifiers to uniquely identify each media program.

Figure 2:
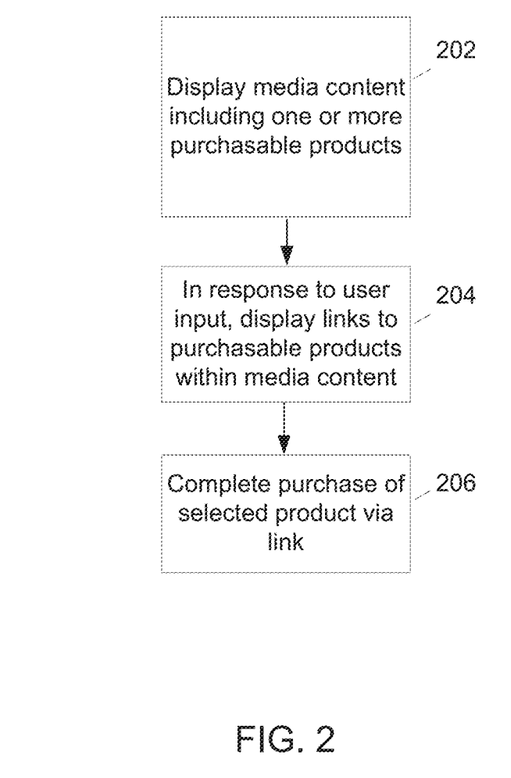
FIG. 2 is a flowchart depicting a method in accordance with one embodiment.
Figure 3:
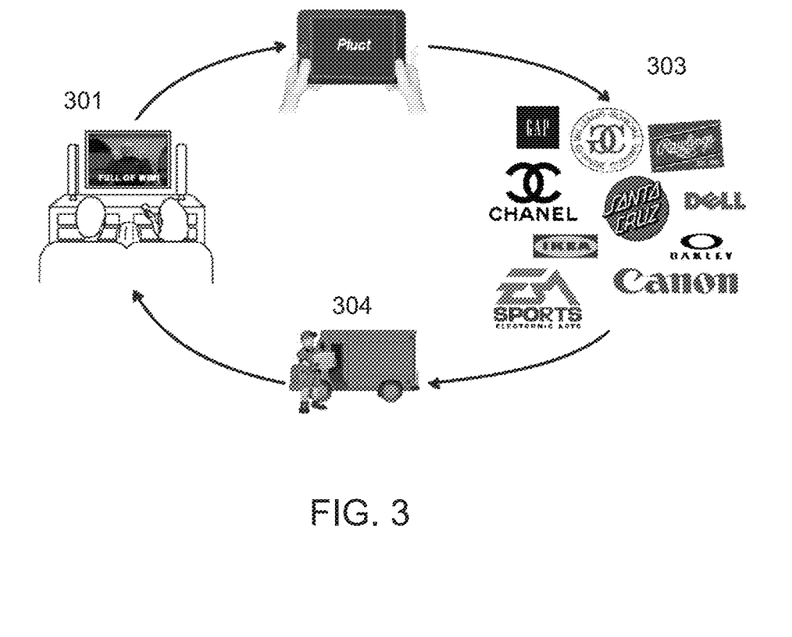
FIG. 3 is a flow diagram corresponding to the flowchart of FIG. 2.

Having thus given an overview of an exemplary system in which the various embodiments described herein may be employed, an exemplary method will now be generally described in conjunction with the block diagram of FIG. 1, the flowchart of FIG. 2, and the conceptual flow diagram of FIG. 3. Initially, at step 202, media content (301) is displayed to one or more users. The media content may be streaming media, network television programming, stored DVR content, or any other such video content. As mentioned above, the displayed media content will generally include (e.g., via product placement within a scene) one or more products that are available for purchase by viewers.

Next, in step 204, links to purchasable products within the media source being viewed are displayed for the user. In one embodiment, for example, the user initiates an application on a tablet or other mobile device (302), and through a suitable user interface specifies the particular episode of the media content being viewed. The application then interfaces with server 192 and downloads to device 190 the appropriate product data 195 corresponding to the selected media content. In another embodiment, the episode being viewed is automatically determined, e.g., based on which channel the user is viewing at that particular time.

In one embodiment, audio fingerprinting and/or computer vision technology is used to sample the media content (e.g., via one or more applications running on device 190) and automatically determine the episode being viewed. That is, a camera within the user's environment (e.g., a webcam or other camera attached to a computing device) or indeed the graphics processing unit of device 190 may sample the episode being viewed and, based on fingerprinting methods known in the art, determine the episode based on a stored database of fingerprint data.

Finally, in step 206, purchase of the selected product is completed via the links to purchasable products (303). That is, for example, the link may take the user to the corresponding Amazon.com item page, allowing the user to conveniently purchase the item and schedule delivery (304). The links may, for example, be hyperlinks displayed by device 190.

Figure 4:
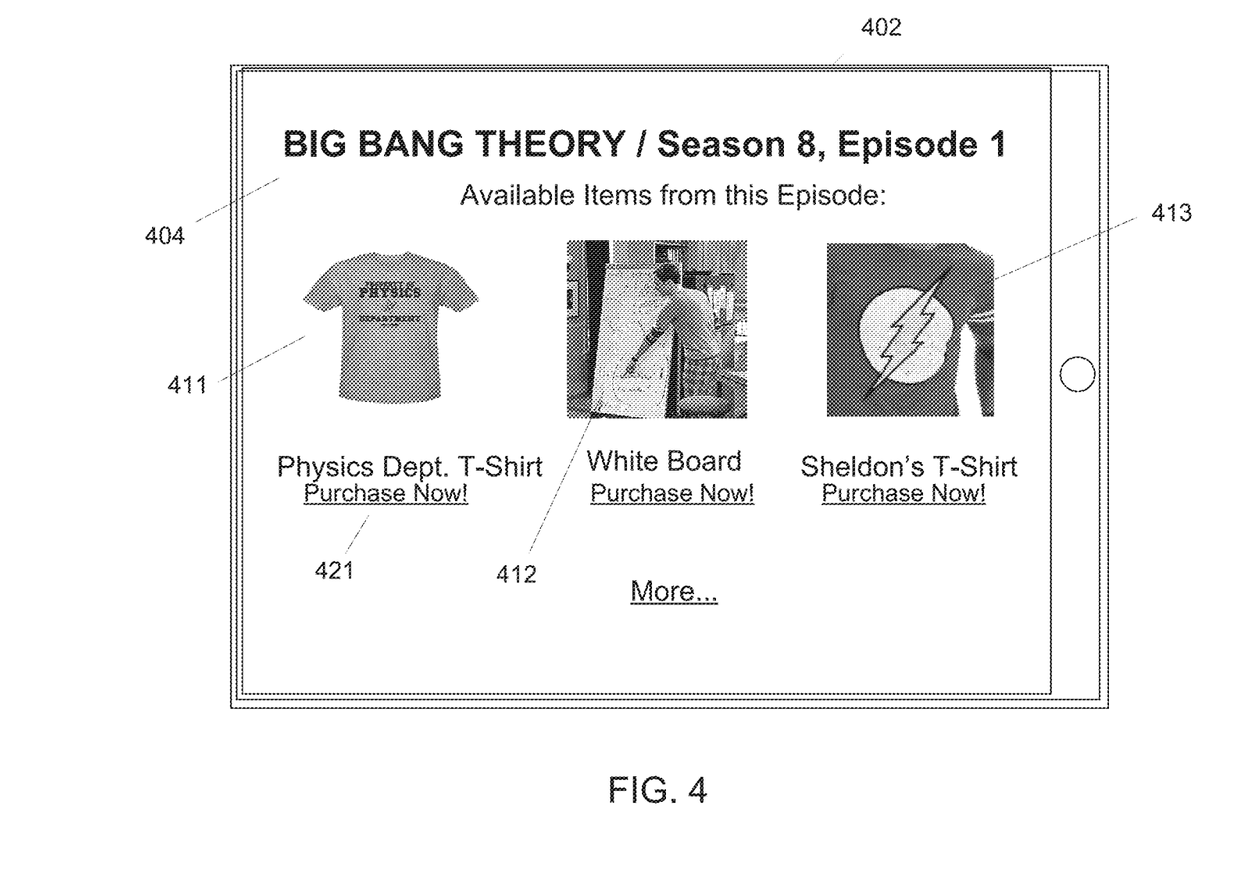
FIG. 4 depicts a user interface for displaying available products in accordance with one embodiment.

FIG. 4 shows one, non-limiting example user interface display for viewing available products. More particularly, display 402 (e.g., the display of mobile device 190 in FIG. 1) includes an identifier 404 of the media content being viewed (in this case, Big Bang Theory, Season 8, Episode 1) along with a thumbnail grid of purchasable items (411, 412, 413) for that episode. Also displayed are corresponding links (e.g., hyperlink 421) that will take the user to an online commerce website or other external source that allows the user to easily purchase the displayed item. The displayed items may, in one embodiment, be arranged with the most popular items placed at the top of the display. In another embodiments, advertisers may pay an added fee to promote their products within the list of purchasable items. In some embodiments, links to social media sites are provided such that the user may notify friends, followers, etc. that he or she has purchased the item using the service.

In summary, what has been described are systems and methods that allow a user to easily purchase items, in near real-time, that appear within a particular show being viewed by the user. Network and content owners benefit through the opening of a new revenue stream, supplementing traditional television advertising. Advertisers and retailers benefit by presenting their products on the most popular media content. In addition, advertisers can mitigate the effects of users fast-forwarding through commercials. In this regard, the service provided in some embodiments may be monetized based on "cost-per-click," as is known in the art, or "cost per impression."

Many other modifications and enhancements could be provided in a wide array of alternate but equivalent embodiments. The term "exemplary" is used herein to represent one example, instance or illustration that may have any number of alternates. Any implementation described herein as exemplary is not necessarily to be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

The invention claimed is:

1. A method for viewing media content carried-out utilizing at least a mobile device and a server, the server maintaining a database correlating product data listings to media content episodes wherein the product data listing comprises: purchaseable products made available for purchase that are related to the viewed media content, the method comprising:
   transmitting user input data, as received at the mobile device, to a placeshifting device located in the user's home requesting streaming delivery of media content episode from the placeshifting device;
   in response to transmission of the user input data, receive at the mobile device the media content episode as streamed from the placeshifting device over the network wherein the mobile device determines the channel on which the media content episode is presented based on user input received at the mobile device selecting the media content episode for streaming transmission to the mobile device from the placeshifting device;
   receiving, through a software application executing on the mobile device, initiated via a software application interface by a user request for specifying a particular media content episode viewed;
   in response to the user request for the product data corresponding to the media content episode, determining a channel on which the media content episode is presented and a current time at which the user is viewing the channel;
   in response to the user request at the mobile device for the product data corresponding to the media content episode, determining by a camera attached to the mobile device the media content episode based on a fingerprinting solution that samples the media content episode viewed to identify the media content episode based on a stored database of fingerprint data and by identifying the media content episode utilizing the determined channel and current time;
   after identifying the media content episode, transmitting a request from the mobile device, over a network, and to the server for product data corresponding to the identified media content episode and stored in the database;
   receiving and presenting the product data corresponding to the identified media content episode at the mobile device when received from the server;
   wherein the product data includes a list of the one or more purchasable products and, for each of the purchasable products, a link to an online commerce site from which the purchasable product may be purchased;
   in response to the user request at the mobile device to purchase the purchasable product via the link, navigating the user to a corresponding item webpage of the online commerce site for purchasing the product and for scheduling delivery;
   enabling the user via the mobile device to purchase the one or more purchaseable products, in near real-time when a particular media content episode is viewed; and
   notifying the user via the mobile device of a selected purchaseable product or a purchase of the selected purchaseable product for the user to share a link via social media sites of the purchaseable product purchased.

2. The method of claim 1, wherein the list of the one or more purchasable products is a list of hypertext links.

3. The method of claim 1, wherein the list of purchasable products is a set of thumbnail images.

4. Non-transitory computer-readable media bearing software instructions that, when executed by a processor contained in a mobile device, cause the mobile device to:
   receive, through a software application executing on the mobile device, user request for product data, initiated via a software application interface to specify a particular media content episode viewed wherein the media content episode is streamed to the mobile device from a placeshifting device located in the user's home, and wherein the mobile device determines the channel on which the media content episode is presented based on user input received at the mobile device selecting the media content episode for streaming transmission to the mobile device from the placeshifting device;
   in response to the user request, utilize the mobile device to determine a channel on which the media content episode is presented and a current time at which the user is viewing the channel;
   in response to the user request determine by a camera attached to the mobile device, the media content episode based on a fingerprint solution that samples the media content episode viewed to identify the media content episode from a stored database of fingerprint data and to identify the media content episode utilizing the determined channel and current time;
   after identifying the media content episode, transmit a request from the mobile device, over a network, and to the server for product data corresponding to the identified media content episode and stored in the database;
   receive and present the product data corresponding to the identified media content episode at the mobile device when received from the server;
   wherein the product data includes a list of one or more purchasable products and, for each of the purchasable products, a link to an online commerce site from which the purchasable product may be purchased;
   display at the mobile device by an identifier of the media content being viewed along with a thumbnail grid of the purchaseable product items for media content episode identified and the link;
   in response to the user request at the mobile device to purchase the purchaseable product via the corresponding link, navigating the user to a corresponding item webpage of the online commerce site for purchasing the purchaseable product and for scheduling delivery of the purchaseable product;
   enable the user via the mobile device to purchase the one or more purchaseable products in near real-time when a particular media content episode is broadcast; and
   notify the user via the mobile device of a selected purchaseable product or a purchase of the selected purchaseable product to enable the user to share a link via social media sites of the purchaseable product purchased using the software application.

5. The non-transitory computer-readable media of claim 4, wherein the list of the one or more purchasable products is a list of hypertext links.

6. A method for viewing media content carried-out utilizing a mobile device in communication with a server over a network, the server maintaining a database correlating product data listings to media content episodes, the method comprising:
   transmitting user input data, as received at the mobile device, to a placeshifting device located in the user's home requesting streaming delivery of media content episode from the placeshifting device;

in response to transmission of the user input data, receive at the mobile device the media content episode as streamed from the placeshifting device over the network;

receiving, through a software application executing on the mobile device, initiated via a software application interface by a user request specifying a particular media content episode viewed;

in response to the user request, utilizing a graphics processing unit contained in the mobile device to identify the media content episode based upon a video sample from a camera attached to the mobile device wherein the media content episode is identified based on a fingerprinting solution that samples the media content episode viewed to identify the media content episode from a stored database of fingerprint data;

after identifying the media content episode, transmitting a request from the mobile device, over the network, and to the server for product data corresponding to the identified media content episode and stored in the database;

receiving and presenting the product data corresponding to the media content episode at the mobile device when received from the server;

wherein the product data includes a list of the one or more purchasable products and, for each of the purchasable products, a link to an online commerce site from which the purchasable product may be purchased;

in response to the user request at the mobile device to purchase the purchasable product via the link, navigating the user to a corresponding item webpage of the online commerce site for purchasing the product and for scheduling delivery;

enabling the user via the mobile device to purchase the one or more purchaseable products in near real-time when a particular media content episode is broadcast; and notifying the user via the mobile device of a selected purchaseable product or a purchase of the selected purchaseable product to enable sharing of a link by the user via social media sites of the purchaseable product purchased using the software application.

\* \* \* \* \*